(12) United States Patent
Czepek et al.

(10) Patent No.: US 7,442,307 B2
(45) Date of Patent: Oct. 28, 2008

(54) METHOD AND APPARATUS FOR THE BIOLOGICAL ACTIVATED SLUDGE TREATMENT OF WASTEWATER

(75) Inventors: Gyula Czepek, Szolnok (HU); Zoltán Takács, Budapest (HU); István Kenyeres, Budapest (HU)

(73) Assignee: Organica Kornyezettechnologiak Zet., Budapest (HU)

( * ) Notice: Subject to any disclaimer, the term of this patent is extended or adjusted under 35 U.S.C. 154(b) by 48 days.

(21) Appl. No.: 10/590,072

(22) PCT Filed: Feb. 16, 2005

(86) PCT No.: PCT/HU2005/000013

§ 371 (c)(1), (2), (4) Date: Aug. 21, 2006

(87) PCT Pub. No.: WO2005/080277

PCT Pub. Date: Sep. 1, 2005

(65) Prior Publication Data

US 2007/0176890 A1 Aug. 2, 2007

(30) Foreign Application Priority Data

Feb. 20, 2004 (HU) .................................. 0400453

(51) Int. Cl.
*C02F 3/00* (2006.01)

(52) U.S. Cl. .................. 210/620; 210/622; 210/121; 210/150; 210/196; 210/220

(58) Field of Classification Search ................ 210/220, 210/196, 150, 121, 620, 622
See application file for complete search history.

(56) References Cited

U.S. PATENT DOCUMENTS

| 4,024,060 | A | * | 5/1977 | Hughes | 210/197 |
| 4,966,705 | A | | 10/1990 | Jamieson et al. | 210/605 |
| 5,866,002 | A | * | 2/1999 | Yates et al. | 210/601 |
| 6,103,123 | A | * | 8/2000 | Gantzer | 210/605 |
| 6,190,554 | B1 | | 2/2001 | Mandt | 210/605 |
| 6,398,957 | B1 | | 6/2002 | Mandt | 210/605 |
| 6,406,628 | B1 | | 6/2002 | Chang et al. | 210/605 |
| 6,514,410 | B1 | * | 2/2003 | Gantzer | 210/605 |

FOREIGN PATENT DOCUMENTS

DE 19816076 A1 10/1998
EP 1099668 A 5/2001

* cited by examiner

*Primary Examiner*—Chester T. Barry
(74) *Attorney, Agent, or Firm*—Joseph G. Seeber (57) ABSTRACT

The equipment has a main reaction (I) and an anterior reactor (II), as well as facilities for feeding in untreated sewage, removing cleaned water and sludge and aerating the wastewater entered into the main reactor, and a mixer (2) situated in the anterior reactor (II), and it is characterized by that between the main reactor (I) and the anterior reactor (II) there is a facility or there are facilitates for the recirculation of wastewater. In the course of the procedure, between the anterior reactor (II) and the main reactor (I) the waste-water aerated in the latter reactor and mechanically stirred in the former reactor is recirculated, and so the transformation of the nitrogen content of the biologically decomposable pollutants by nitrification takes place in the main reactor, while the biological elimination of the nitrates created in the course of the nitrification (denitrification) takes place in the anterior reactor, and as a result of the anaerobic processes biological phosphorus elimination is also ensured (FIG. 1).

20 Claims, 8 Drawing Sheets

METHOD AND APPARATUS FOR THE BIOLOGICAL ACTIVATED SLUDGE TREATMENT OF WASTEWATER

TECHNICAL FIELD

The invention relates to equipment for the biological activated sludge treatment of waste-water containing organic pollutants, especially municipal and/or food industry waste-water, and a method or procedure for the operation of such equipment.

RELATED ART

There are two basic methods for the biological activated sludge treatment of waste-water containing organic pollutants: continuous and discontinuous (SBR—sequencing batch reactor) technology. The difference between these two solutions is that, while in continuous systems the individual cleaning technology operations—removal of organic materials, phosphor and nitrogen, phase separation—are performed in such a way that they are separated from each other in space, in the SBR system, these processes take place in the same space, following each other shifted in time. Both systems have their advantages and disadvantages, and this may be the reason for the appearance of solutions based on the combination of the two technologies in the field of waste-water treatment.

The main advantages of the SBR technology are that it can follow hydraulic and pollutant loading fluctuations better than continuous systems, using less energy, and the operational reliability of settling is higher, since in the phase of settling there are no fluid flows influencing the settling of sludge floc. A further advantage of the SBR technology is that, even in the case of low performance demand, e.g. below 100 $m^3$/day, it can be easily equipped with technological machinery, whereas for a continuous system of such capacity, there are no suitable low capacity waste-water pumps available in commercial distribution, and at the same time there is a risk that the pipes with a small cross-section may get blocked.

An important advantage of continuous technologies is that the removal of biological nutrients (N, P) takes place in separate spaces, so that the efficiency of these operations is less influenced by operation settings, and their operational reliability is higher. A further advantage is that, if a pre-denitrification step is inserted in the series of operations, the nitrate content of the water entering the settling plant is lower, and consequently there is a lower change or risk of sludge levitation deriving from denitrification. In the case of continuous systems, the chances are also better for the use of the selector principle to ensure the restriction of filament creation in sludge.

U.S. Pat. No. 6,406,628 describes a solution for the improvement of the nutrient removal efficiency of the SBR technology. According to this, fermented metabolite created in the course of rotting organic wastes is entered into the sequencing batch reactor at the right point in time, as an easily soluble source of carbon. Due to this, N and P elimination becomes extremely favourable, but its disadvantage is that additional sludge is created. A further disadvantage is that, with respect to the sewage treatment plant of a small settlement, the task of collecting, storing and processing organic waste unreasonably increases the labour demand of operation.

The technology described in U.S. Pat. No. 4,966,705 is based on the combination of continuous and SBR systems. This symbol contains a main reactor equipped with a fixed decanter and an anterior reactor performing a balancing and selecting function. This means that the cleaned water of the current previous batch is decanted by displacement by the entered waste-water mass of the current following batch. With the settled sludge taken back to the anterior reactor after decanting the amount of water with a high content of nitrates, getting back into the space where denitrification can take place remains below the amount that would make N elimination justified in the course of the treatment of municipal waste-water with average composition. Since, in this case, the amount of the returned liquid determines the minimum amount of the following batch, recirculation cannot be optimised to nutrition elimination.

In the system described in U.S. Pat. Nos. 6,190,554 and 6,398,957, there is also an anterior reactor and a main reactor, in this system, recirculation aiming toward the anoxic anterior reactor is dimensioned for nutrition elimination, so that the conditions for the denitrification process, that is, biological nitrogen elimination, are ensured. A separate anoxic preliminary denitrification space is advantageous because labile organic materials ensuring rapid denitrification do not dilute in there, but instead they are completely used for nitrate elimination in the lack of solute oxygen. A disadvantage of the system is that it does not ensure sufficient biological phosphorus elimination. Although optionally the system contains an anaerobic reactor, it is used for sludge digestion, and thus the phosphorus integrated in the sludge enters the solution gain and gets into the main reactor together with the escaped water, this means that, with excess sludge, biological phosphorus elimination is not possible.

A further disadvantage of these solutions is that none of the treatment plants contain continuous hydraulic connection under the level of the liquid, and therefore the anoxic preliminary denitrification space cannot be taken into consideration as a settling unit. In the case of SBR technology, the upper level of the sludge in the liquid determines the amount of cleaned liquid that can be drained, which, in turn, also determines the daily hydraulic capacity of the treatment plant.

Another disadvantage of the solution is that, due to the operation of the anoxic preliminary denitrification space as an equalising taken, in other words, due to the continuous input, the biological processes taking place there cannot be optimised.

In the solution contained in European Patent Application No. EP 1,099,668, continuous hydraulic connection exists between the anterior reactor and the aerated main reactor. However, the disadvantage of this connection permitting the flow of the medium is that the connection is at the level of the base plate, and so when the treated water is taken away, the liquid flowing into the main reactor mixes up the activated sludge, as a consequence of which suspended matter may get into the treated water, which significantly damages the degree of efficiency of the treatment plant.

A further disadvantage of these solutions in that the airlift carries out force flow backward from the main reactor to the anterior reactor. As a result, the airlift dissolves oxygen in the anterior reactor, thus restricting the anoxic processes taking place there.

A further deficiency of the treatment plant is that inputting of the untreated waste-water takes place from above, through which the activated sludge pumped there earlier, as in a plug-flow reactor, is forced through the lower connection into the main reactor. In this procedure, it is this procedural step that is important, as it is the objective for untreated waste-water not to get mixed up with treated water during simultaneous decanting. However, this can result in a disadvantageous situation in that, at this time, the untreated waste-water deliberately does not get mixed with the sludge, and so there is no effective N and P removal. It is only after this phase that transfer between the two spaces takes place (S-phase). There is no recirculation during the aeration phase (B phase). The consequence of this, however, is at this process is only able to remove the nitrate contamination in accordance with the volume ratio between the two spaces, which causes insufficient efficiency.

The equipment described in German Patent Specification No. DE 198 16 076 also uses two connections between the SBR's main and auxiliary reactors, which, independently of each other, due to various mechanical procedures, can be opened or closed. This form of control is costly, and due to the operation devices, the probability of faults is increased.

A further disadvantage is that the pre-treatment tank does not contain a mixer, and so the anoxic processes take place only in a restricted way.

The disadvantage of the process carried out in the treatment plant is that, during decanting, the hydraulic connection connecting the anterior and the main reactors is closed, and so the pre-treatment tank cannot be taken into consideration as a settling space, and this has an unfavourable effect on the degree of efficiency and performance of the treatment plant.

SUMMARY OF INVENTION

The task to be solved with the invention is to provide activated sludge biological waste-water treatment equipment and a procedure with batch operation, as a result of which it becomes less difficult to provide it with technological machinery, even in the case of a low capacity demand or small size, and as a result of the appropriate operation of the equipment, it becomes possible to adapt flexibly to hydraulic and pollutant loading fluctuations; on the other hand, the solution must ensure, with high operational reliability, a high efficiency of nitrogen and biological phosphorus elimination, which should be about 90% in the case of nitrogen and 80-85% in the case of phosphorus.

The invention is based on the recognition that, if no mixing is performed in the aerated main reactor used for secondary settling, but aeration is performed even during filling, and all operations for which no aeration is needed are performed in an anaerobic/anoxic anterior reactor in which a mechanical mixer is operated in the phase between filling and settling, and from the main reactor water rich in nitrates and activated sludge kept in suspension is taken back to the anterior reactor, then fairly efficient denitrification can be ensured, and organic material and phosphorus elimination can also be solved perfectly.

On the basis of the above recognition, in accordance with the invention, the set task was solved with equipment for the treatment of waste-water containing organic pollutants, especially municipal or/and food industry waste-water, which has a main reactor and an anterior reactor, and facilitates for feeding in untreated sewage, removing cleaned water and sludge and aerating the waste-water entered into the main reactor. The invention also has a mixer situated in the anterior reactor, the main reactor and the anterior reactor are separated from each other by a partition wall, and between the main reactor and the anterior reactor there is at least one device for the recirculation of waste-water.

The device for the recirculation of waste-water has a U-shaped pipe-piece providing arms for recirculation, the one arm of the U-shaped pipe-piece being situated in the anterior reactor, the other arm of the U-shaped pipe-piece being situated in the main reactor, and they are separated from each other by a partition wall. The lower end of the one arm and the lower end of the other arm are connected with a pipe taken through this partition wall, and their upper ends are situated at a height suiting the minimum water-level determined in these reactors. An air-pipe with an end-fitting ensuring airlift function is connected to the other arm of the U-shaped pipe-piece situated in the main reactor. With respect to the upper end of the one arm and the upper end of the other arm, at a certain distance, there is a transfer opening in the partition wall ensuring recirculation.

A further preference of the invention is that the air-pipe branches off the aerating system belonging to the main reactor.

In accordance with another realisation of the invention, the aerating system belonging to the main reactor has a blowing device and an air-pipe starting from it, distributor air-pipes that are connected to the above air-pipe and run near the base plate of the main reactor, and air-injection heads connected to these air-pipes.

According to another construction, the cleaned-water draining device is a decanter situated on a floating body. It is also favourable that, if there is a pump situated in a compensation basin for feeding in untreated sewage, the pump should enter the anterior reactor.

The procedure according to the invention, as realised by operating the equipment for biological activated sludge treatment of waste-water containing organic pollutants, contains at least one filling phase, one reaction phase, one settling phase, one draining phase and one sludge-removing phase. In the filling phase, the main reactor is filled from a minimum level to a maximum level with untreated sewage first taken into the lower range of the sludge mass situated in the anterior reactor and then taken from the anterior reactor to the main reactor. In a given case, the water situated in the main reactor is aerated. Then, in the nitrification-denitrification reaction phase, the water situated in the main reactor is aerated, and the water situated in the anterior reactor is stirred, practically mechanically, while the waste-water is recirculated between the two reactors. Then, the sludge is settled from the waste-water treated as above, and finally the treated sewage is drained from the equipment by decanting in a way that the water-level in the reactors is reduced to a minimum level, and the excess sludge is removed from the reactors.

In the filling phase, a U-shaped pipe-piece is used to transfer the untreated waste-water from the anterior reactor to the main reactor, and then the untreated waste-water is transferred to the main reactor using the siphon principle of the U-shaped pipe-piece. In this way, the water level in the anterior reactor and the main reactor is raised to a common maximum level. Following this, in the reaction phase, air is blown in through the air-pipe in the other arm of the U-shaped pipe-piece in the main reactor, and thus, using the U-shaped pipe-piece as an airlift, a part of the amount of liquid in the anterior reactor is sucked through the U-shaped pipe-piece into the main reactor, and thus the level of the liquid in the main reactor is forced above the level of the transfer opening, and the amount of liquid exceeding the level of the transfer opening passes through the transfer opening back to the anterior reactor, and thus recirculation is created.

BRIEF DESCRIPTION OF DRAWINGS

Below the invention is described in detail on the basis of the attached drawings, which show a favourable construction of the equipment and its operation. In the drawings.

DETAILED DESCRIPTION

Figure 1:
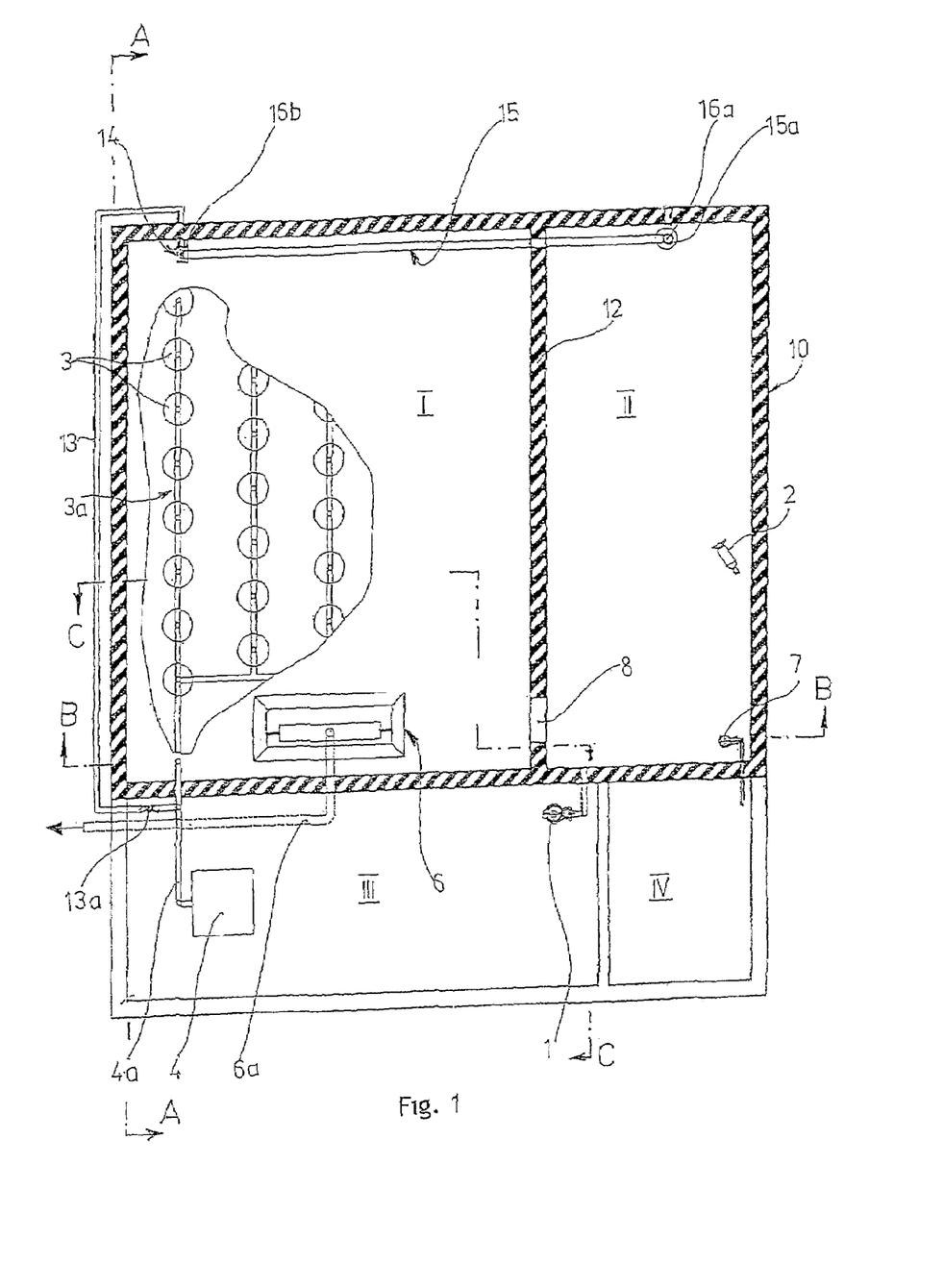
FIG. 1 shows a construction of the equipment in a section taken along line E-E shown in FIG. 2.
Figure 2:
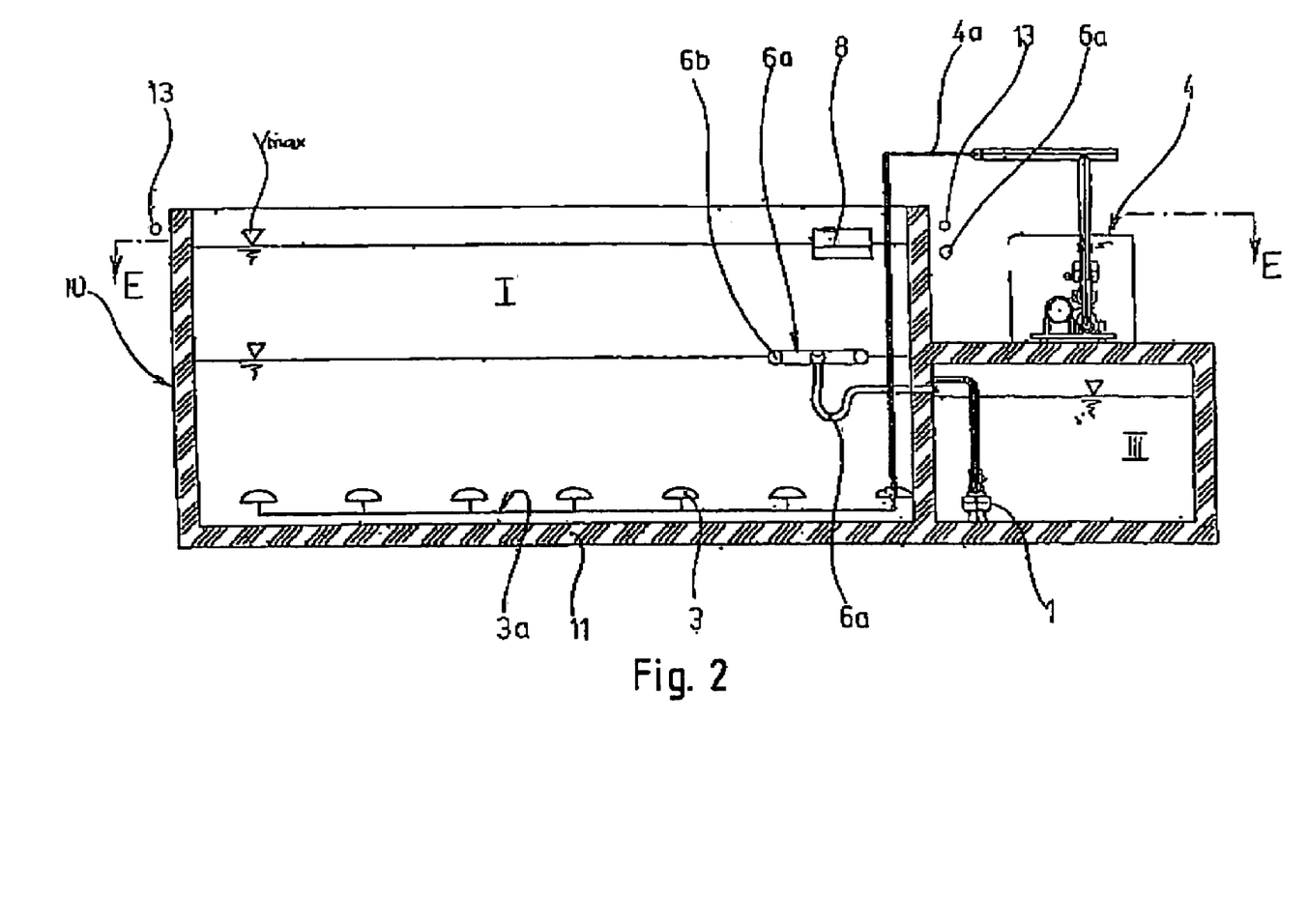
FIG. 2 is a section taken along line A-A shown in FIG. 1.
Figure 3:
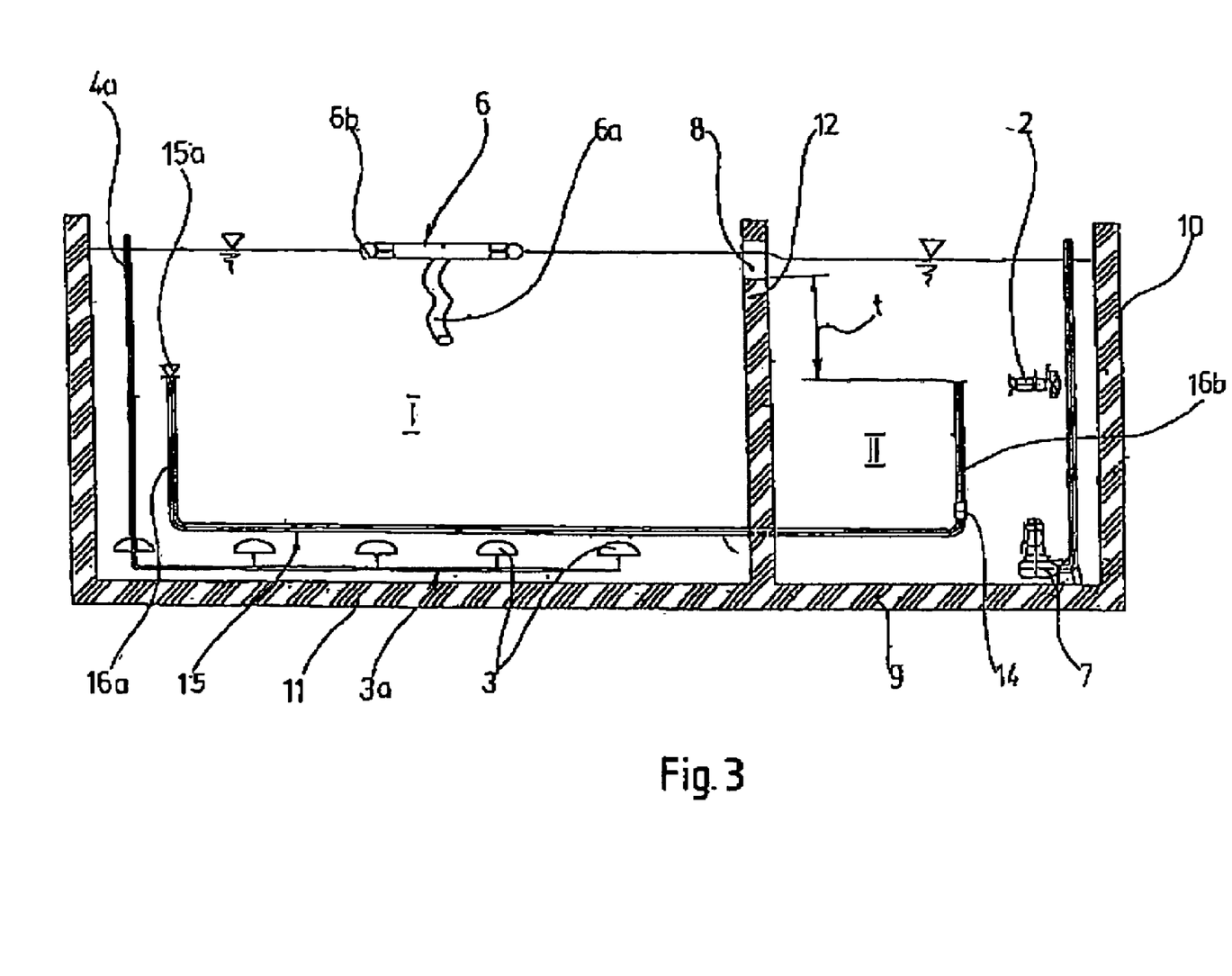
FIG. 3 is a section taken along line B-B shown in FIG. 1.

As can be seen in FIGS. 1-3, the equipment according to the invention has a main reactor I, an anaerobic/anoxic anterior reactor II, a compensation basis III and an excess sludge tank IV, all created inside one single tank structure marked with reference number 10 as a complete unit, and it has a feeding pump 1, a recirculation pump 5 and an excess sludge removing pump 7. The compensation basin III ensures the even loading of the cleaning steps, or in the case of very low loading, it ensures the possibility of standstill. The discharge pipe 1a of the feeding pump 1 enters the anterior reactor II, near its base plate 9 (FIG. 4); in the anterior reactor II, there is a mechanical mixer 2 below the $v_{max}$ water-level (FIGS. 1 and 3). An air-injection device 54 (FIG 2) situated outside the tank structure 10 is also a part of the equipment, which is connected to the system of air-distributor pipes 3a running near the base plate 11 of the main reactor I with an air-pipe 4a, and air-injecting heads 3 are connected to the pipes of the distributor pipe system 3a (FIGS. 1-5).

In the case of the present construction, the equipment also has a U-shaped pipe-piece 15 with its arms stretching upward, used for recirculating the waste-water between the main reactor I and the anterior reactor II, and the lower horizontal part of this U-shaped pipe-piece 15 is taken through the partition wall 12. One of its arms 16a stretching upward, provided with a funnel 15a at the top, is situated in the anterior reactor II, while its other arm 16b is situated in the main reactor I, and their end openings are situated at the same height. The height at which these openings are situated is determined by defining a minimum water-level height. This U-shaped pipe-piece 15, as described below, can operate in two modes: on the basis of the law of intercommunicating vessels due to the water-level differences, or as an airlift, because it is connected to the air-injection device 4 shown in FIG. 2 with an air-pipe 13 containing an end-fitting 13a starting from connection place 14 (also see FIG. 5), and so, when the end-fitting 13a is opened, if the air-injection device 4 is in operation, the U-shaped pipe-piece 15, as an airlift, pumps the water out of the anterior reactor II into the main reactor I. In order to ensure recirculation, a transfer opening 8 is created in the upper section of the partition wall 12 separating the main reactor I from the anterior reactor II.

In the main reactor I, in the water-level range following the changing of the water-level there is a decanter 6 on a floating body 6b moving up and down following the changing of the water-level (FIGS. 1-3), and the takeoff pipe 6a is taken outside the tank structure 10.

On the base plate 9 of the anterior reactor II or in its vicinity, there is a pump 7 to ensure the removal of excess sludge, and its discharge pipe 7a is taken outside the tank structure 10 or into the excess sludge tank IV.

The operation of the equipment according to FIGS. 1-3—the procedure realised with the equipment—is described below in detail with reference to FIGS. 4-8, where the already described devices are marked with the same reference numbers as used in FIGS. 1-3.

Figure 4:
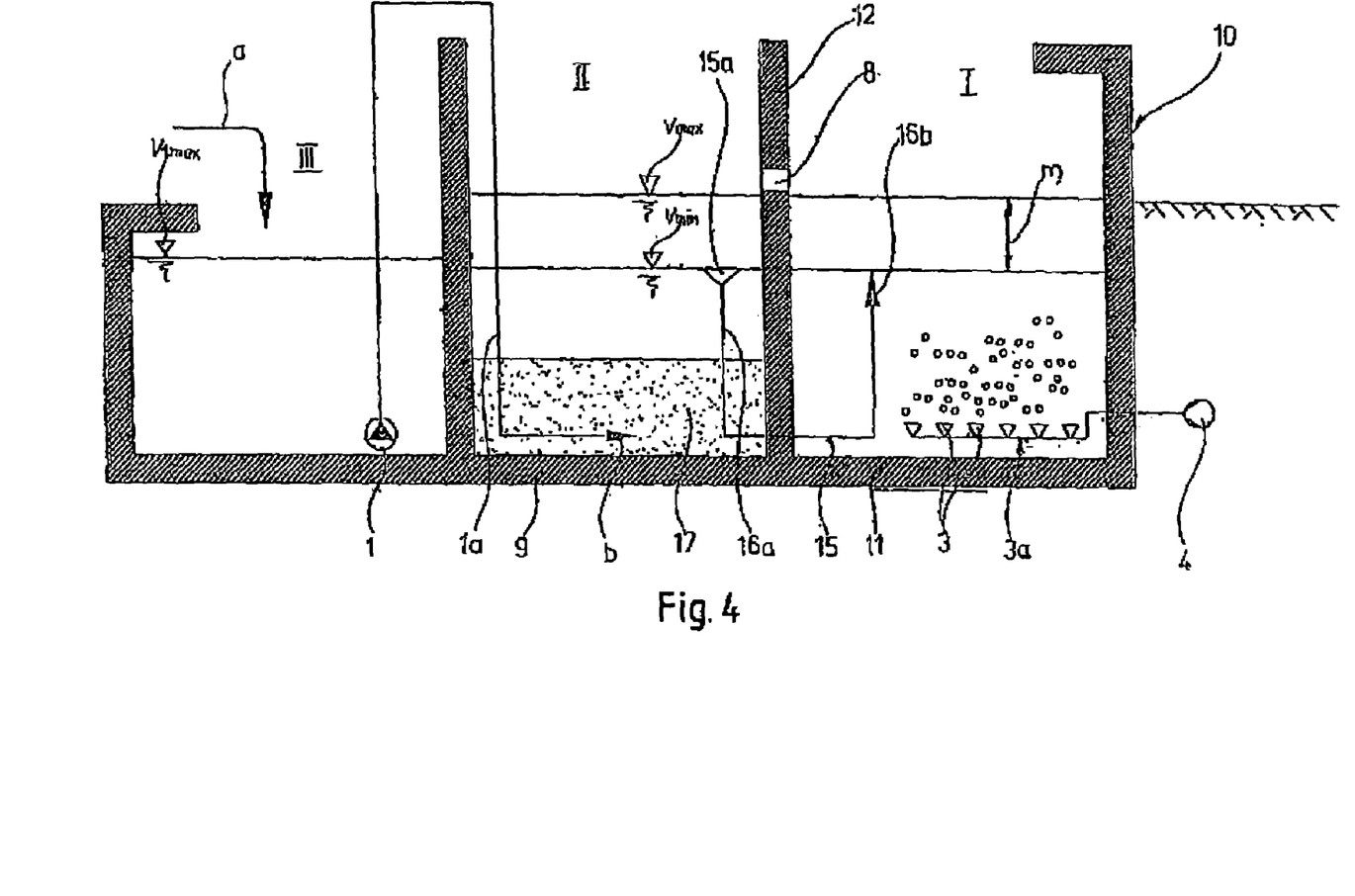
FIGS. 4-8 show the filling, reaction, settling, cleaned-water draining and excess sludge removing phases of the equipment shown in FIGS. 1-3, in a section taken along line C-C shown in FIG. 1.

FIG. 4 shows the filling phase of the procedure, at the starting of which the $v_{min}$ water-level is at the minimum low, decantation level both in the anterior reactor II and in the main reactor I. In the two reactors, the filling level is marked with reference letters $v_{max}$. During the filling phase, the water-levels in the two reactors change together within the range of m height. During the filling process, the untreated sewage enters the compensation basin III as shown by arrow a, where it can reach a level of $v_{1max}$; in the meantime, with the feeding pump 1, untreated sewage is fed from the compensation basin III to the bottom of the anterior reactor II as shown by arrow b, preferably without significantly stirring up the sludge settled there in the previous cleaning phase, but distributing the untreated sewage in the sludge mass. In the sludge 17, the organic material content of the untreated sewage causes the rapid decreasing of the oxygen level to zero, anaerobic conditions are created, the bacteria cells use up their polyphosphate reserves, and they generate phosphor accumulation in the liquid. In the meantime, the water-level rises both in the anterior reactor II and in the main reactor I to the maximum $v_{max}$ level, nearly up to the lower rim of the transfer opening. Through the U-shaped pipe-piece 15, practically, the main reactor I is filled up at the same time as the anterior reactor II, where the untreated sewage goes as shown by arrow b. However, because there is no mixing, only a small amount of untreated sewage gets into the main reactor I, were aeration should be practically started through the air-injection heads 3 (also see FIGS. 1-3) during filling by blowing air into the liquid, which ensures the oxidation of the organic materials stored in the cells and, through this, the rapid absorption of the organic material content of the batch entered during the actual filling phase.

Depending on the capacity of the current equipment, a filling phase can last for 0-60 minutes. Filling is started only when there is a sufficient amount of untreated sewage in the compensation basin III for the batch.

Figure 5:
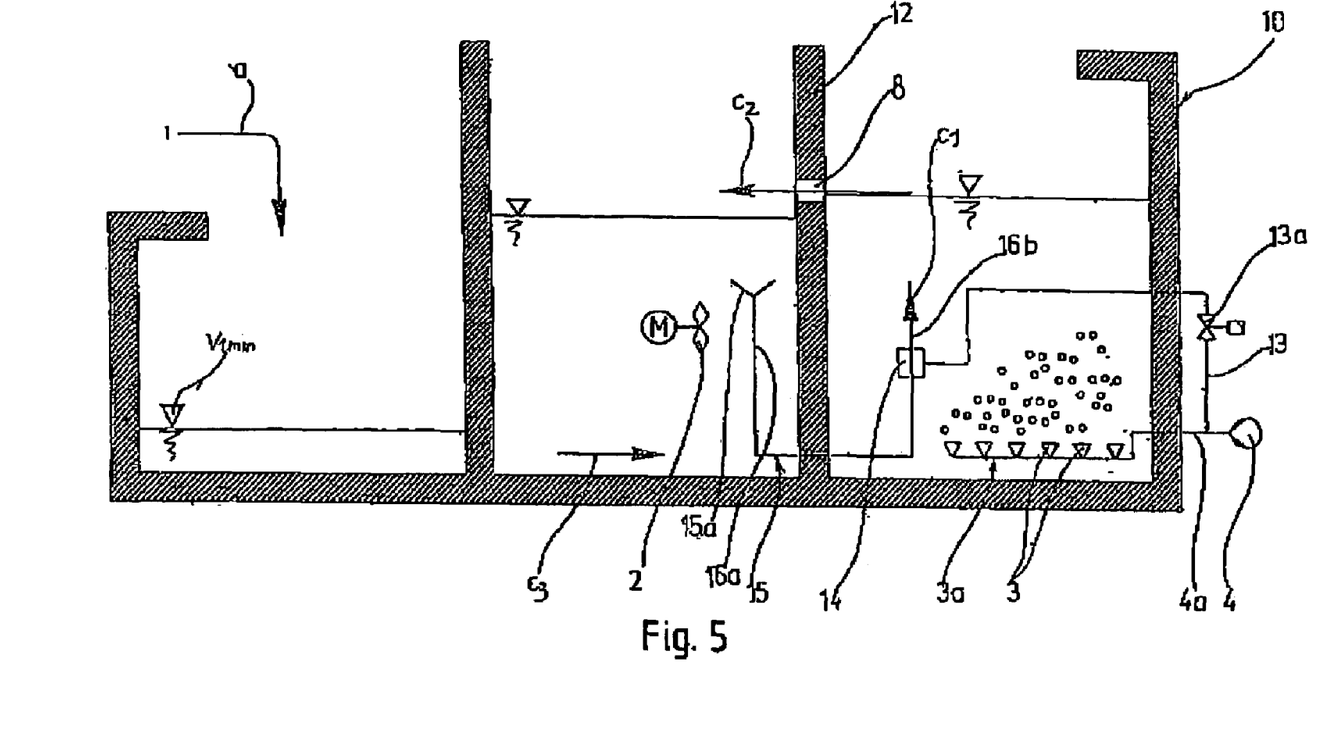

FIG. 5 shows the process of the reaction, organic material elimination, nitrification and denitrification, which can generally last for 60-240 minutes. At the beginning of this phase, the anterior reactor II and the main reactor I are filled up to the maximum water-level. In the anterior reactor II, mixing is started by starting up the mechanical mixer 2, and during this phase the sludge combined with untreated sewage is stirred up and mixed with the water containing nitrates that remained from the previous cycle demixed on top, and by this the conditions of denitrification are created. In the main reactor I, aeration takes place during the complete reaction phase, which results in the elimination of organic materials and the nitrification ammonia. As these processes are completed, the use of the entered oxygen slows down, which results in a rising level of solute oxygen. When receiving a control signal based on this, a control-operation device (not shown here) starts up liquid recirculation between the main reactor I and the anterior reactor II, which process, in the case according to the present construction, with respect to the low lift demand, takes place on the basis of the airlift principle by opening the end-fitting 13a (also see FIGS 1 and 3), as a result of which high-pressure air flows into the other arm 16b of the U-shaped pipe-piece 15 at the connection place 14, causing the liquid to move. Recirculation takes place through the transfer opening 8—measuring weir—and the U-shaped pipe-piece 15 as shown by arrows $c_1$-$c_3$. As a result of recirculation from the anterior reactor II, more activated sludge containing organic materials and ammonia, mixed with untreated sewage, gets into the main reactor I, which results in the acceleration of the oxygen absorption process and the reduction, or at least the stabilisation, of the solute oxygen level of the reactor. In the meantime, activated sludge with a high content of nitrates flows back into the anterior reactor II—practically through a small deoxygenation space (not shown here)—due to gravity. In the anterior reactor II, the nitrates are denitrificated with the help of the organic materials that remained there, and by this the elimination of nitrogen from the sewage is ensured.

As recirculation results in the mixing of the water masses situated in the main reactor I and the anterior reactor II, an increasing amount of water is needed to forward one unit of organic pollutants into the main reactor I, and so recirculation gradually accelerates. By the end of the reaction phase shown in FIG. 5, the concentration of pollutants in the two reactors can be more or less the same. All through the complete reaction phase, the circumstances prevailing in both reactors make it possible for the bacterium to replace the phosphate lost in the anaerobic phases and accumulate excess phosphate, and by this phosphor elimination by sludge removal, that is, biological phosphor elimination, is realised.

Figure 6:
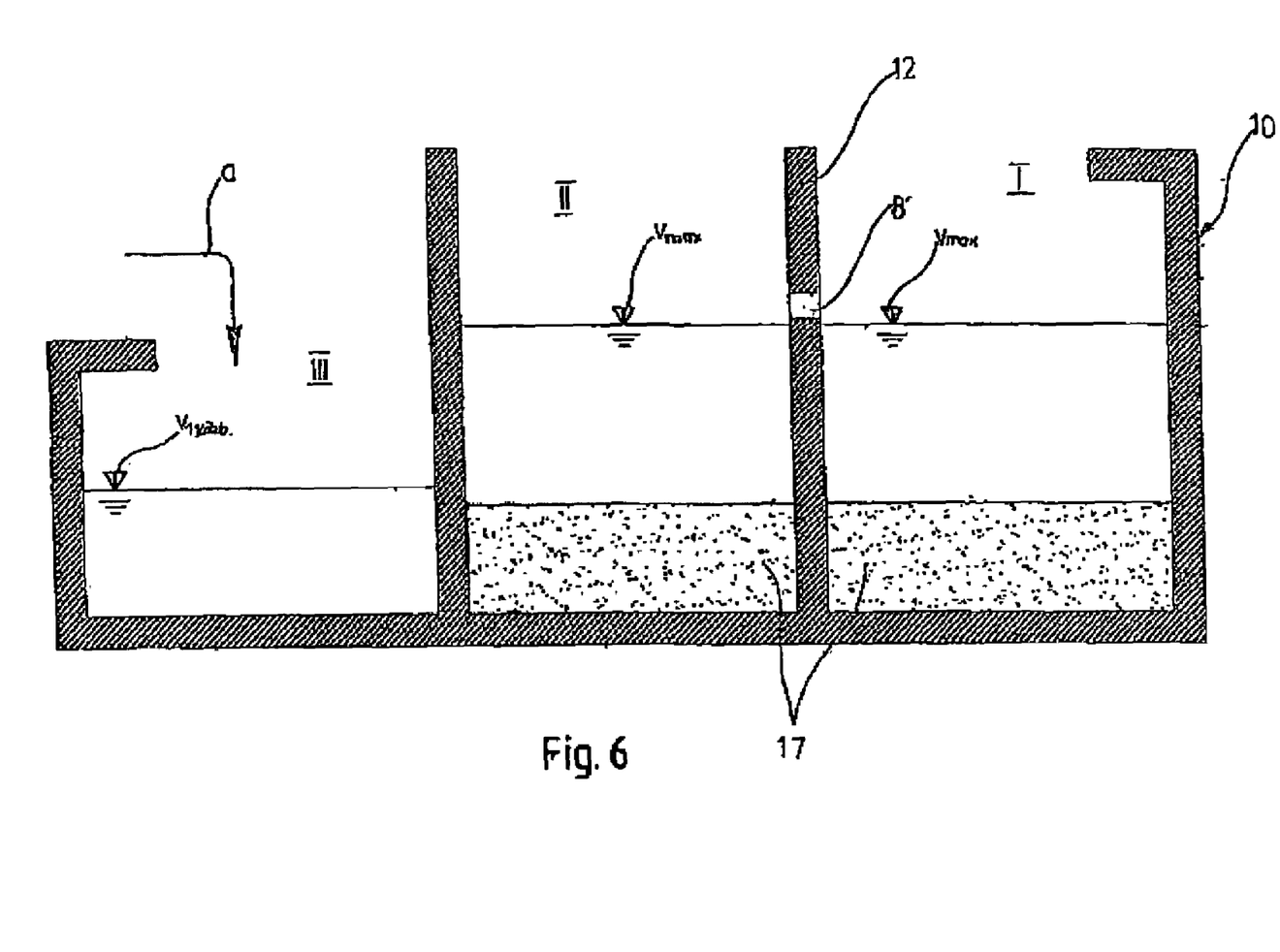

Generally, the settling phase of the procedure shown in FIG. 6 takes 30-60 minutes. Both air intake in the main reactor I and mixing in the anterior reactor II are suspending during the entire settling process (the necessary machines and devices are not shown in FIG. 6). By the end of the phase, the sludge 17 settles in both reactors to the bottom of the water mass at level $v_{max}$. Obviously, untreated sewage can arrive in the compensation basin III, even during the settling phase, as shown by arrow a.

Figure 7:
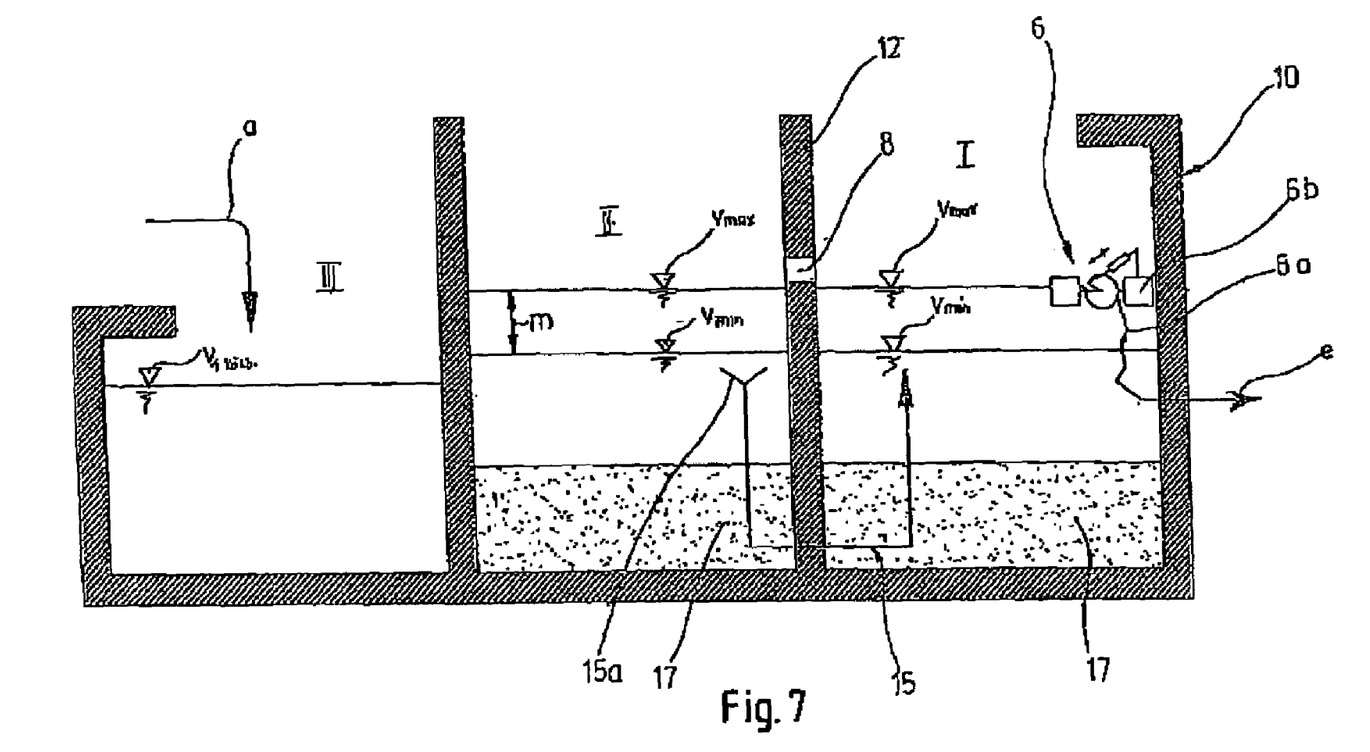

In the phase of the procedure shown in FIG. 7, the cleaned water is taken for example to the reception area as shown by arrow e; this phase may take 30-60 minutes, and mixing and aeration is suspended during this phase. In this phase, cleaned water of the amount of one batch is taken away, according to the present example with the help of the decanter 6 described above in connection with FIGS. 1-3, which always takes water from the top layer of the water mass of a few centimetres, always the same yield and simultaneously from the main reactor I and from the anterior reactor II, so that the sludge 17 at the bottom cannot get mixed in. By the end of the phase, the initial maximum $v_{max}$ water-level reduces to a minimum $v_{min}$ level. This is the lower decantation level, and an amount of one batch is a water mass of $v_{max} - v_{min} = m$ height.

Figure 8:
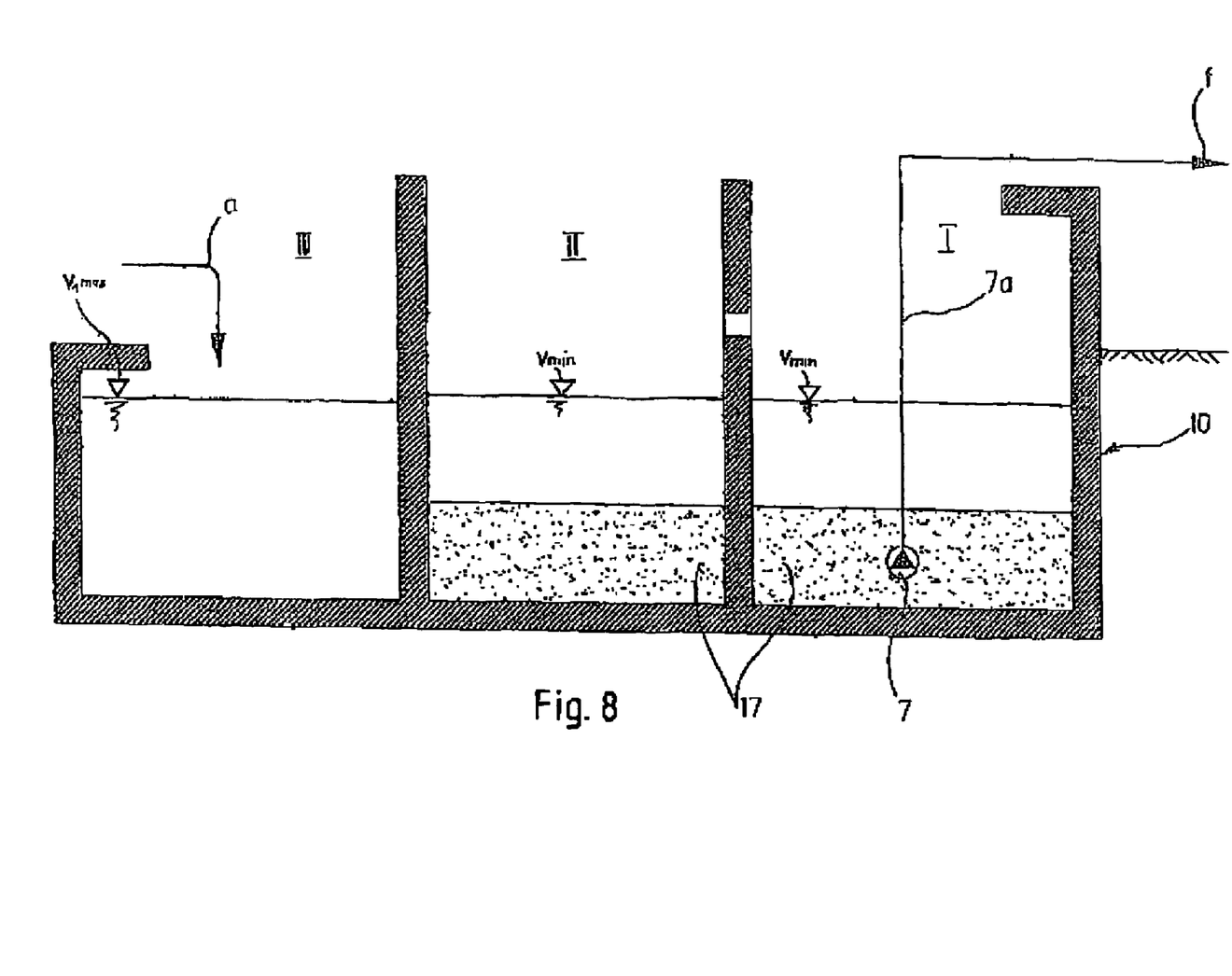

Finally, FIG. 8 shows the excess sludge removal phase of the procedure, which generally takes 5-30 minutes, and for which a pump 7 submerged in the sludge 17 is used as shown in FIGS. 1-3. During this phase, the excess biomass created in the system is removed from the system as shown by arrow e. The sludge is discharged into the excess sludge tank IV shown in FIG. 1. Sludge can be removed from either one of the reactors because, in the course of recirculation, the whole water mass is mixed in both reactors so intensively that, practically, it becomes a homogeneous sludgy mass of water, and during flow, there is compensation in this sense too.

Practically, the term of the phases stated above do not depend on the nominal capacity of the current equipment, which can be generally 10-3000 m³/day per phase.

It must be pointed out that, in place of the air-injection aeration method described above, other ordinary aeration methods—e.g. mechanical oxygen intake, etc.—can also be used.

Consequently, on the basis of the above, the cleaning process takes place according to the classical cycles or phases, such as filling, reaction, settling, cleaned water decantation and excess sludge removal. As compared to the traditional SBR system, the basic difference is that, on the one part, there is no mixer in the main reactor I, aeration takes placed in there practically during the filling phase, and it is suspended only during the settling, decantation and excess sludge removal phases, whereas the processes for which no aeration is required take place in the anterior reactor II, where the mechanical mixer operates in the phase between filling and settling and it does not operate during the filling phase. At this point, untreated sewage is entered into the sludge 17 settled in the anterior reactor II, practically in batches, at a low rate to avoid the sludge getting stirred up. During filling, anaerobic conditions are created in the sludge layer, as a result of which the conditions of biological phosphor elimination are created. During the filling phase, the filling of the main reactor I is also started through the overflow pipe—pipe-piece 15—situated at the decantation level, and although no significant amount of untreated water gets here during the filling phase, aeration can be started, as a result of which the organic materials absorbed by the biomass are decomposed, and the absorption of organic materials is faster when the untreated sewage is mixed in.

In the reaction phase, maybe at the end of the filling phase, by operating the mechanic mixer in the anaerobic/anoxic anterior reactor II, the water with a high content of nitrates that remained there from the previous cycle in the top layer is mixed with the untreated sewage and the activated sludge in the lower layers, which, due to the presence of the soluble organic materials, results in rapid denitrification. As described above, in the reaction phase (FIG. 5), the sewage containing activated sludge is pumped from the anterior reactor II into the main reactor I with an airlift, and a discharge mouth—the transfer opening 8—ensures recirculation toward the anterior reactor II. The flow toward the main reactor I takes organic materials and ammonia there, which creates a demand for oxygen, and the water flowing through the discharge mouth takes nitrates into the anterior reactor II. The rate of recirculation gradually accelerates as programmed in advance. The decomposition of the organic materials and the nitrification of the ammonia results in the decreasing of the oxygen demand in the aerated space, so that, in order to make use of the aeration capacity, a further amount of untreated sewage mixed with more activated sludge needs to be entered into the main reactor using its decomposing activity. Due to the recirculation dilution the organic pollutant concentration of the anoxic anterior reactor gradually decreases, so that increasingly faster recirculation is needed for using up the oxygen intake. By the end of the aeration cycle, a completely mixed system is created.

In summary it can be stated that:
- in the anterior reactor, anaerobic, anoxic and sedimentation processes take place, while in the main reactor, aerobic and sedimentation processes take place, and the reduction of the biologically decomposable organic material content of the waste-water by accumulation and the increasing of the phosphorus content caused by it take place in the anterior reactor, while the nearly complete elimination of the organic material and phosphorus content takes place in the main reactor; and
- the transformation of the nitrogen content of the biologically decomposable pollutants by nitrification takes place in the main reactor, while the biological elimination of the nitrates created in the course of the nitrification (denitrification) takes place in the anterior reactor.

Finally, it should be emphasized that vegetation can be planted in both the main reactor I and the anterior reactor II in such a way that, in the case of a reactor with a fixed water-level, vegetation is planted on a grid fitted near the water surface, while in the case of a reactor with a changing water-level, vegetation is planted on a grid fitted on a floating body. In both cases, the roots grow into the water of the reactor space. The plant roots with a great specific surface, due to the micro organisms settling on them, realise submerged fixed-film biological cleaning, supplementing the activated sludge system, that is, they facilitate biochemical reactions on the roots and intensify the cleaning technology.

The advantage of the invention is that the aeration capacity does not need to be dimensioned on the basis of the traditionally large oxygen demand after feeding in the case of the ordinary SBR systems, and by keeping the oxygen consumption at a more or less permanent level, the aeration volume is used to the maximum. Furthermore, there is no need to invest in a frequency converter regulating the air injector.

Obviously, the invention is not restricted to the concrete construction of the equipment or the realisation of the procedure described above, but it can be realised in several different ways within the scope of protection determined by the claims.

The invention claimed is:

1. Equipment for the treatment of waste-water containing organic pollutants, comprising:
    a main reactor;
    an anterior reactor; and
    means for feeding in untreated sewage, removing cleaned water and sludge, and aerating waste-water entered into the main reactor;
    said anterior reactor including a mixer;
    the main reactor and the anterior reactor being separated from each other by a partition wall;
    said equipment further comprising at least one device between the main reactor and the anterior reactor for recirculation of waste-water;
    said at least one device having a U-shaped pipe-piece providing arms for the recirculation, one arm of the U-shaped pipe-piece being situated in the anterior reactor, another arm of the U-shaped pipe-piece being situated in the main reactor;
    said partition wall separating a lower end of said one arm and a lower end of said another arm, said lower end of said one arm and said lower end of said another arm being connected by a pipe passing through said partition wall;
    an upper end of said one arm and an upper end of said another arm being situated at a height corresponding to a minimum water-level as determined in the main and aeration reactors;
    wherein an air-pipe with an end-fitting ensuring airlift function is connected to said another arm of the U-shaped pipe-piece situated in the main reactor; and
    wherein there is a transfer opening, disposed in the partition wall a certain distance from the lower end of said one arm and the lower end of said another arm, for ensuring the recirculation.

2. The equipment of claim 1, wherein the air-pipe branches off an aerating system belonging to the main reactor.

3. The equipment of claim 2, wherein the main reactor has a blowing device and an air-pipe extending from it, air-distributor pipes connected to the air-pipe and located near the main reactor, and air-injector heads connected to the air-distributor pipes.

4. The equipment of claim 3, further comprising a cleaned-water draining device including a decanter situated on a floating body.

5. The equipment of claim 4, further comprising a pump located in a compensation basin for feeding in untreated sewage, the pump extending into the anterior reactor.

6. The equipment of claim 3, further comprising a pump located in a compensation basin for feeding in untreated sewage, the pump extending into the anterior reactor.

7. The equipment of claim 2, further comprising a cleaned-water draining device including a decanter situated on a floating body.

8. The equipment of claim 2, further comprising a pump located in a compensation basin for feeding in untreated sewage, the pump extending into the anterior reactor.

9. The equipment of claim 1, wherein the main reactor has a blowing device and an air-pipe extending from it, air-distributor pipes connected to the air-pipe and located near the main reactor, and air-injector heads connected to the air-distributor pipes.

10. The equipment of claim 1, further comprising a cleaned-water draining device including a decanter situated on a floating body.

11. The equipment of claim 1, further comprising a pump located in a compensation basin for feeding in untreated sewage, the pump extending into the anterior reactor.

12. The equipment of claim 1, wherein the main reactor has a blowing device and an air-pipe extending from it, air-distributor pipes connected to the air-pipe and located near the main rector, and air-injector heads connected to the air-distributor pipes;
    said equipment further comprising a cleaned-water draining device including a decanter situated on a floating body.

13. The equipment of claim 1, wherein the main reactor has a blowing device and an air-pipe extending from it, air-distributor pipes connected to the air-pipe and located near the main reactor, and air-injector heads connected to the air-distributor pipes;
    said equipment further comprising a pump located in a compensation basin for feeding in untreated sewage, the pump extending into the anterior reactor.

14. The equipment of claim 1, further comprising a cleaned-water draining device including a decanter situated on a floating body, and a pump located in a compensation basin for feeding in untreated sewage, the pump extending into the anterior reactor.

15. A method for biological activated sludge treatment of waste-water containing organic pollutants, comprising:
    a filling phase in which a main reactor and an anterior reactor are filled from a minimum level to a maximum level with untreated sewage first taken into a lower range of a sludge mass situated in the anterior reactor, and then taken from the anterior reactor to the main reactor, water situated in the main reactor being aerated;
    a reaction phase in which nitrification-denitrification reaction takes place, the water situated in the main reactor being aerated, and water situated in the anterior reactor being stirred, practically mechanically, while the waste-water is recirculated between the main and anterior reactors;
    a settling phase in which sludge is settled from the waste-water treated as above; and
    a draining phase in which treated sewage is drained by decanting in such a way that water levels in the main and anterior reactors are reduced to a minimum level and excess sludge is removed from the main and anterior reactors;
    wherein the filling phase comprises using a U-shaped pipe-piece to transfer untreated waste-water from the anterior reactor to the main reactor.

16. The method of claim 15, wherein
    the untreated waste-water is transferred to the main reactor using a siphon principle of the U-shaped pipe-piece, whereby the water levels in the anterior reactor and the main reactor are raised to a common maximum level.

17. The method of claim 15, wherein the reaction phase comprises blowing air through an air-pipe in an arm of the U-shaped pipe-piece in the main reactor, thereby using the U-shaped pipe-piece as an airlift, a part of liquid in the anterior reactor being sucked through the U-shaped pipe-piece into the main reactor, a level of liquid in the main reactor being forced above a level of a transfer opening, an amount of the liquid in the main reactor exceeding the level of the transfer opening passing through the transfer opening back to the anterior reactor, whereby recirculation takes place.

18. The method of claim 15, wherein the U-shaped pipe-piece is used so that an upper part of the treated water is moved from the anterior reactor to the main reactor and the excess sludge is removed from the main and anterior reactors.

19. A method for biological activated sludge treatment of waste-water containing organic pollutants, comprising:

a filling phase in which a main reactor and an anterior reactor are filled from a minimum level to a maximum level with untreated sewage first taken into a lower range of a sludge mass situated in the anterior reactor, and then taken from the anterior reactor to the main reactor, water situated in the main reactor being aerated;

a reaction phase in which nitrification-denitrification reaction takes place, the water situated in the main reactor being aerated, and water situated in the anterior reactor being stirred, practically mechanically, while the waste-water is recirculated between the main and anterior reactors;

a settling phase in which sludge is settled from the waste-water treated as above; and a draining phase in which treated sewage is drained by decanting in such a way that water levels in the main and anterior reactors are reduced to a minimum level and excess sludge is removed from the main and anterior reactors;

wherein the reaction phase comprises blowing air through an air-pipe in an arm of a U-shaped pipe-piece in the main reactor, thereby using the U-shaped pipe-piece as an airlift, a part of liquid in the anterior reactor being sucked through the U-shaped pipe-piece into the main reactor, a level of liquid in the main reactor being forced above a level of a transfer opening, an amount of the liquid in the main reactor exceeding the level of the transfer opening passing through the transfer opening back to the anterior reactor, whereby recirculation takes place.

20. The method of claim 19, wherein a part of liquid in the anterior reactor is sucked through the U-shaped pipe-piece into the main reactor, a level of liquid in the main reactor being force above a level of a transfer opening, an amount of the liquid in the main reactor exceeding the level of the transfer opening passing through the transfer opening back to the anterior reactor, whereby recirculation takes place.

* * * * *